United States Patent
Winger et al.

(10) Patent No.: US 7,327,786 B2
(45) Date of Patent: Feb. 5, 2008

(54) METHOD FOR IMPROVING RATE-DISTORTION PERFORMANCE OF A VIDEO COMPRESSION SYSTEM THROUGH PARALLEL COEFFICIENT CANCELLATION IN THE TRANSFORM

(75) Inventors: Lowell L. Winger, Waterloo (CA); Pavel Novotny, Waterloo (CA); Guy Cote, Elora (CA)

(73) Assignee: LSI Logic Corporation, Milpitas, CA (US)

( * ) Notice: Subject to any disclaimer, the term of this patent is extended or adjusted under 35 U.S.C. 154(b) by 787 days.

(21) Appl. No.: 10/452,262

(22) Filed: Jun. 2, 2003

(65) Prior Publication Data

US 2004/0240556 A1 Dec. 2, 2004

(51) Int. Cl.
- H04N 7/12 (2006.01)
- H04N 11/02 (2006.01)
- H04N 11/04 (2006.01)
- H04B 1/66 (2006.01)

(52) U.S. Cl. .................. 375/240.12

(58) Field of Classification Search .......... None
See application file for complete search history.

(56) References Cited

U.S. PATENT DOCUMENTS

| | | | | |
|---|---|---|---|---|
| 5,691,770 A * | 11/1997 | Keesman et al. | ...... | 375/240.04 |
| 5,812,788 A * | 9/1998 | Agarwal | ...... | 709/247 |
| 6,167,084 A * | 12/2000 | Wang et al. | ...... | 375/240.02 |
| 6,263,021 B1 * | 7/2001 | Sethuraman et al. | ... | 375/240.03 |
| 6,404,933 B1 * | 6/2002 | Yamamoto | ...... | 382/251 |
| 6,831,947 B2 * | 12/2004 | Ribas Corbera | ...... | 375/240.03 |
| 2002/0034245 A1 * | 3/2002 | Sethuraman et al. | ... | 375/240.03 |
| 2004/0141654 A1 * | 7/2004 | Jeng | ...... | 382/238 |
| 2004/0234147 A1 * | 11/2004 | Malvar | ...... | 382/240 |

* cited by examiner

Primary Examiner—Nhon Diep
(74) Attorney, Agent, or Firm—Christopher P Maiorana PC

(57) ABSTRACT

A method for improving rate distortion performance of a compression system through parallel coefficient cancellation in a transform comprising the steps of (A) determining a block sum of absolute values for each of a plurality of blocks in a macroblock and (B) setting one or more coefficient values of a block to zero in response to a block sum value of said block being less than a first predetermined threshold value.

22 Claims, 5 Drawing Sheets

METHOD FOR IMPROVING RATE-DISTORTION PERFORMANCE OF A VIDEO COMPRESSION SYSTEM THROUGH PARALLEL COEFFICIENT CANCELLATION IN THE TRANSFORM

FIELD OF THE INVENTION

The present invention relates to data compression generally and, more particularly, to a method for improving rate-distortion performance of a video compression system through parallel coefficient cancellation in the transform.

BACKGROUND OF THE INVENTION

Compression of digital video data is needed for many applications. Transmission over limited bandwidth channels such as direct broadcast satellite (DBS) and storage on optical media (i.e., CD, DVD, etc.) are typical examples. In order to achieve efficient compression, complex, computationally intensive processes are used for encoding (or compressing) and decoding (or decompressing) digital video signals. For example, even though MPEG-2 is known as a very efficient method for compressing video, more efficient compression standards such as H.264 (and MPEG-4) are being developed.

Compression performance can be evaluated by measuring the cost versus the benefit of compressing an image. The cost or "rate" generally refers to the number of bits used to code the compressed data (e.g., video, audio, etc.). The benefit can be measured by how well the decompressed image approximates the original image (i.e., the amount of distortion introduced by the compression). Distortion generally refers to the signal-to-noise ratio (SNR) of the compressed data. In general, when the rate is decreased without simultaneously increasing the distortion, the rate-distortion (RD) of the compressed video is improved. For example, the video may look at least as good while requiring less storage and/or bandwidth to transmit.

One technique for improving rate-distortion (RD) of encoded video is coefficient cancellation prior to the entropy coding stage in an encoder. Blocks with all quantized coefficients set to zero require very few bits in standard video encoders due to a frequent occurrence. The very few bits result in efficient signaling (i.e., coded block pattern) for blocks with all quantized coefficients set to zero in the compressed video bitstream syntax. Similarly, macroblocks with only zero coefficients are also efficiently signaled (i.e., "skipped" macroblocks). When the entire residual block (or macroblock) is set to zero, the decoded reconstructed compressed video block becomes exactly the prediction for that block.

Two existing classes of measurements used in coefficient cancellation include 1) a calculation of a macroblock-based sum-of-absolute differences (or similar efficient parallel measurement) on predicted versus original pixels and 2) a calculation of a more accurate block-cost measurement based on the number and coding order of very small (e.g., +1 and −1) non-zero quantized coefficients. In the first class, the measurement is calculated prior to transformation and quantization. However, by only estimating which macroblocks to skip, the first class of measurement can fail to take advantage of efficiency that can be realized through setting individual blocks to zero.

In the second class, the measurement is calculated after transformation, quantization, and zig-zag scanning (i.e., serialization) of the coefficients. The measurement can even be performed after the entropy coding when an exact calculation of the precise rate cost of block cancellation is desired (i.e., a so-called "greedy" estimate of the rate cost since it does not necessarily go to the last stage of taking into account future coding decisions).

The disadvantage of the existing coefficient cancellation techniques is primarily that they achieve a poor trade-off between implementation complexity and estimation accuracy. A solution that improves rate-distortion performance of a video encoder would be desirable.

SUMMARY OF THE INVENTION

The present invention concerns a method for improving rate-distortion performance of a compression system through parallel coefficient cancellation in a transform comprising the steps of (A) determining a block sum of absolute values for each of a plurality of blocks in a macroblock and (B) setting one or more coefficient values of a block to zero in response to a block sum value of said block being less than a first predetermined threshold value.

The objects, features and advantages of the present invention include providing a method for improving rate-distortion performance of a video compression system through parallel coefficient cancellation in the transform that may (i) calculate a parallel arithmetic measurement on quantized block coefficients, (ii) calculate a weighted sum of absolute values (SAV), (iii) determine the weight of a calculation based upon macroblock type, (iv) increase lower frequency coefficients by a factor of two, (v) reuse intermediate coefficient absolute values calculated by a quantizer to calculate a parallel arithmetic measurement, (vi) set coefficients of one or more blocks, combinations of blocks and/or macroblocks to zero based on the parallel arithmetic measurement, (vii) provide an efficient hierarchical summation method that operates on block coefficients to determine measurements on groups of luminance (luma) blocks and groups of chrominance (chroma) blocks, (viii) provide an efficient hierarchical summation method that operates on block coefficients to determine measurements on entire macroblocks, (ix) use fixed thresholds and sums of absolute value calculations, (x) provide efficient encoding of H.264/MPEG4-AVC, MPEG-2, MPEG-4, and Windows Media 9 video bitstreams, (xi) provide improved rate-distortion performance over measurements based only on pixel residues, (xii) provide reduced complexity over serial methods, (xiii) maximize re-use of calculation results already available in a video codec while maintaining a parallel process, (xiv) result in very low additional complexity, (xv) provide very high estimation accuracy, and/or (xvi) provide an efficient hierarchical decision structure reflecting the hierarchical nature of compressed video bitstream syntax.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Transformed and quantized pixel prediction-residual coefficients that require a relatively larger number of bits to code and yet contribute relatively little to improving the signal to noise ratio of the compressed video can be set to zero by a coefficient cancellation process. Existing solutions attempt to identify entire macroblocks or blocks, rather than individual coefficients, to set to zero, because significant rate reductions can be achieved through efficient signaling mechanisms in the syntax at the macroblock or block level. A measurement can be used to determine the estimated RD-cost of a macroblock, group of blocks or individual block followed by a decision mechanism (e.g., a threshold value) to determine if the macroblock, group of blocks or block should be set to zero.

In a preferred embodiment, the measurement of rate-distortion (RD) cost is performed as close as possible to the end of the transform, quantization and entropy coding pipeline in order to get the most accurate estimation possible while taking advantage of the efficiency of using existing preceding modules to aid in performing the estimation. However, parallelization of the measurement is possible when the measurement is calculated prior to serialization of the coefficients. The serial portion of a codec may be a bottleneck for many platforms. Inherently serial processes may constrain implementation flexibility, particularly for hardware, variable length instruction word (VLIW), and single instruction multiple data (SIMD) platforms.

For a very large class of platforms capable of efficiently exploiting parallelism, a method and/or apparatus for calculating a block-based measurement on the transformed and quantized coefficients of a macroblock or block prior to serialization in order to get the best trade-off between implementation complexity and estimation accuracy is generally advantageous. The present invention generally provides improved rate-distortion (RD) performance in, for example, the compressed video provided by a video encoder.

Figure 1:
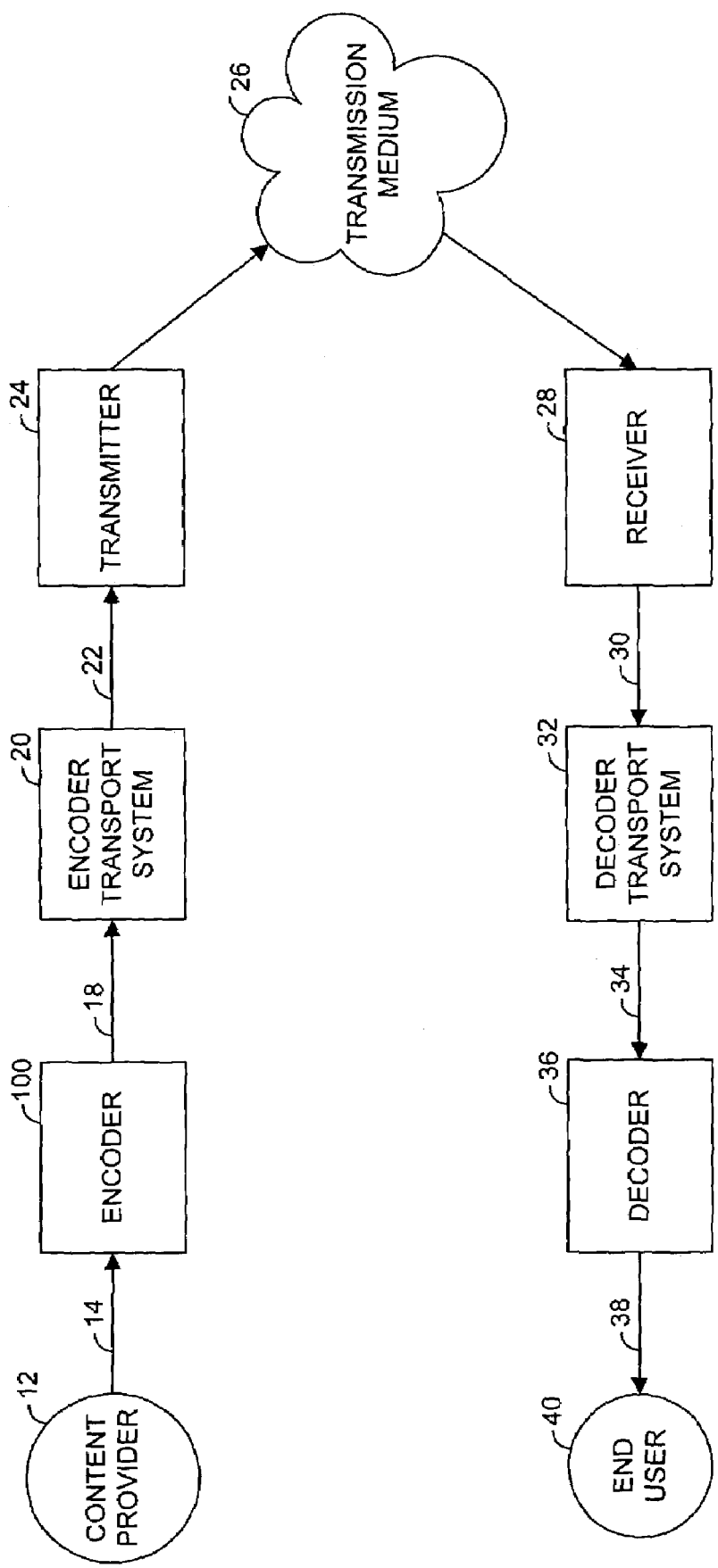
FIG. 1 is a block diagram illustrating various components of a compressed video transmission system.

Referring to FIG. 1, a block diagram of a system 10 is shown. In general, a content provider 12 presents video image, audio or other data 14 to be compressed and transmitted to an input of an encoder 100. The compressed data 18 from the encoder 100 may be presented to an encoder transport system 20. An output of the encoder transport system 20 generally presents a signal 22 to a transmitter 24. The transmitter 24 transmits the compressed data via a transmission medium 26.

On a receiving side of the system 10, a receiver 28 generally receives the compressed data bitstream from the transmission medium 26. The receiver 28 presents a bitstream 30 to a decoder transport system 32. The decoder transport system 32 generally presents the bitstream via a link 34 to a decoder 36. The decoder 36 generally decompresses the data bitstream and presents the data via a link 38 to an end user 40.

Figure 2:
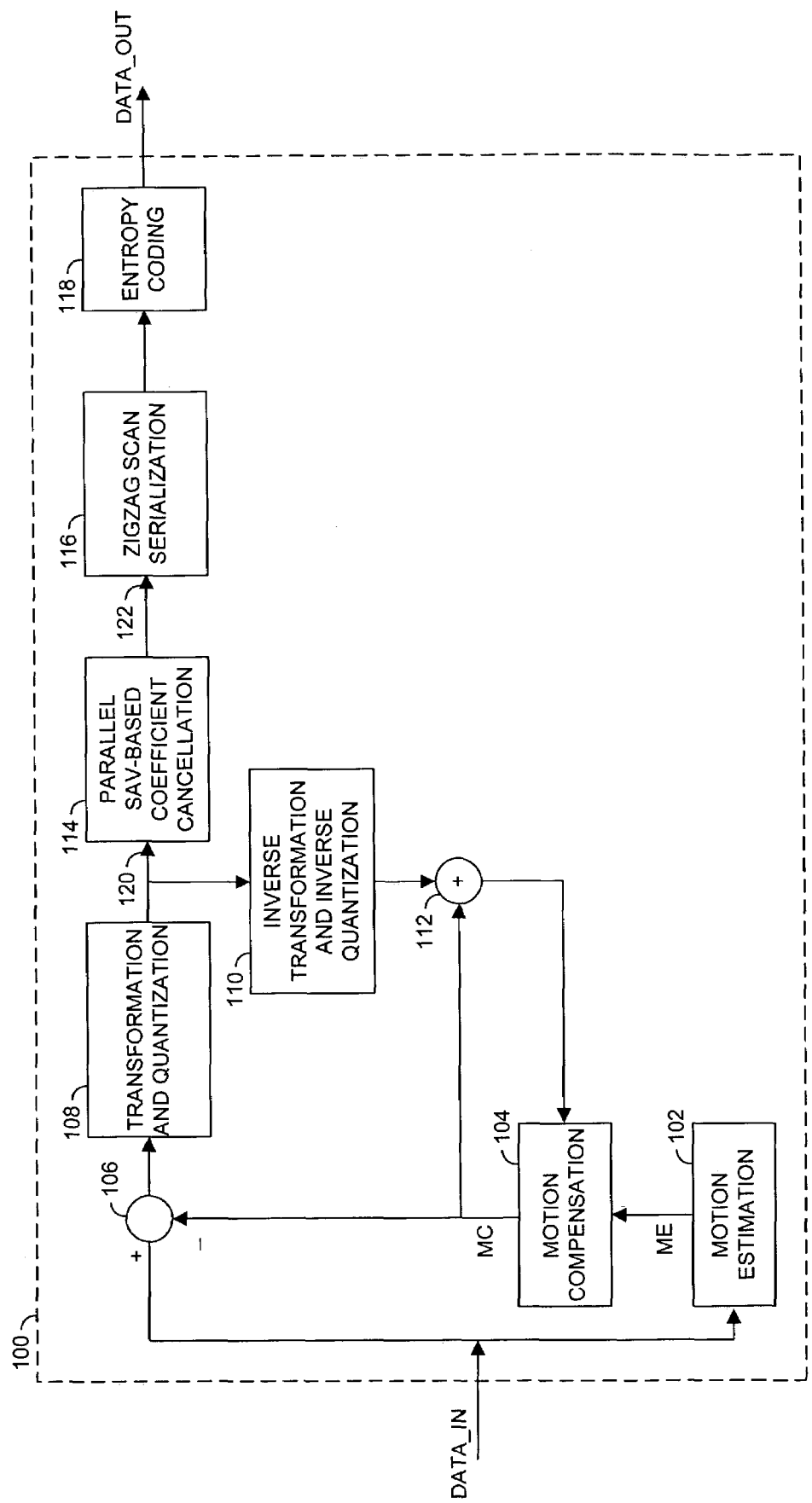
FIG. 2 is a more detailed block diagram illustrating an example encoder in accordance with a preferred embodiment of the present invention.

Referring to FIG. 2, a more detailed block diagram of an encoder 100 in accordance with a preferred embodiment of the present invention. The encoder 100 may comprise a motion estimation block (or circuit) 102, a motion compensation block (or circuit) 104, an adder 106, a transformation and quantization block (or circuit) 108, an inverse transformation and inverse quantization block (or circuit) 110, an adder 112, a coefficient cancellation block 114, a zig-zag scan (or serialization) block (or circuit) 116, and an entropy coding block (or circuit) 118. The blocks 102, 104, 106, 108, 110, 112, 116 and 118 may be implemented using conventional techniques known to those of ordinary skill in the art.

The coefficient cancellation block 114 may be configured to perform, in one example, a parallel sum of absolute values (SAV) based coefficient cancellation technique (described in more detail below in connection with FIG. 5). However, the coefficient cancellation block 114 may be configured to apply other block-based measurements accordingly to meet the design criteria of a particular implementation. In one example, the parallel sum of absolute values may use absolute values determined in a previous stage (e.g., from the transformation and quantization block 108).

A signal (e.g., DATA_IN) received at an input of the encoder 100 is generally presented to an input of the motion estimation block 102 and a first input of the adder 106. An output of the motion estimation block 102 may present a signal (e.g., ME) to an input of the motion compensation block 104. The motion compensation block 104 generally has an output that presents a signal (e.g., MC) to (i) a second input of the adder 106 and (ii) a first input of the adder 112. An output of the adder 106 is generally presented to an input of the transformation and quantization block 108. An output of the transformation and quantization block 108 is generally presented to an input 120 of the parallel coefficient cancellation block 114 and an input of the inverse transformation and inverse quantization block 110. An output of the inverse transformation and inverse quantization block 110 is generally presented to a second input of the adder 112. An output of the adder 112 is generally presented to a second input of the motion compensation block 104.

The parallel coefficient cancellation block 114 generally has an output that may present a signal to an input 122 of the zig-zag scan serialization block 116. The zig-zag scan serialization block 116 generally has an output that may present a signal to an input of the entropy coding block 118. The entropy coding block 118 generally presents a signal (e.g., DATA_OUT) at the output of the encoder 100.

Figure 3:
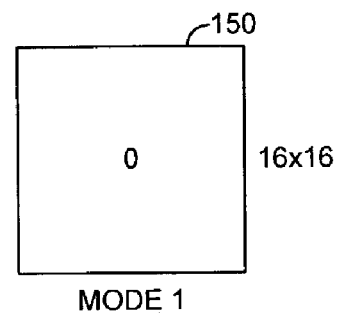
FIG. 3 is a block diagram illustrating various block sizes and shapes.
Figure 3:
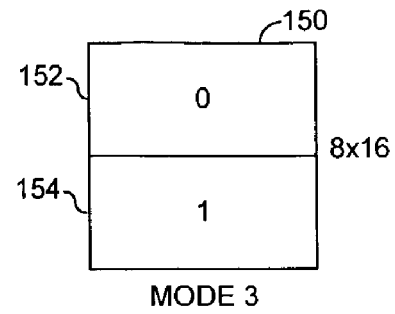
Figure 3:
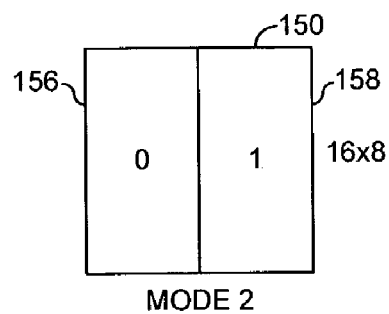
Figure 3:
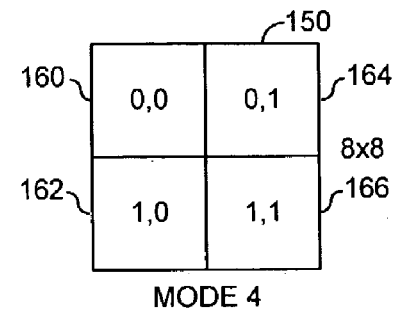

Referring to FIG. 3, a block diagram is shown illustrating various block sizes and shapes that may be used to perform motion estimation (ME) and/or motion compensation (MC) on a macroblock 150. The macroblock 150 may be, in one example, a portion of an H.264 compliant bitstream. In one example, the macroblock 150 may be implemented as a 16×16 block. However, other size macroblocks may be implemented accordingly to meet the design criteria of a particular application. Each 16×16 macroblock 150 may be predicted with a single 16×16 vector (e.g. mode 1). Alternatively, the macroblock 150 may be segmented into two 16×8 blocks 152 and 154 (e.g., mode 2) or two 8×16 blocks 156 and 158 (e.g., mode 3) in which case two motion vectors may be generated for predicting the macroblock 150. The macroblock 150 may also be segmented into four 8×8 blocks 160-166 (e.g., mode 4) in which case four motion vectors may be generated for the macroblock 150.

Figure 4:
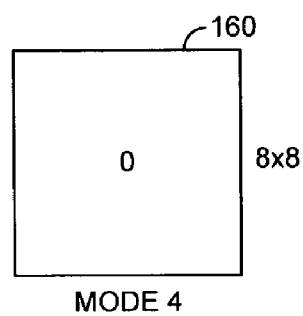
FIG. 4 is a block diagram illustrating various sub-block sizes and shapes.
Figure 4:
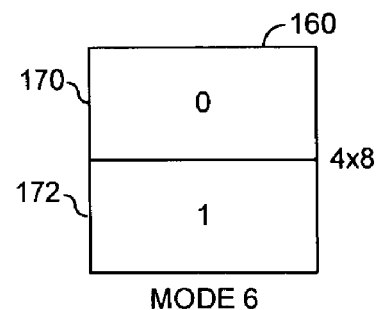
Figure 4:
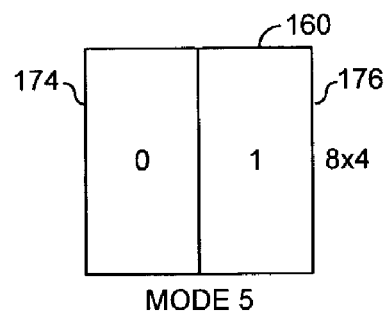
Figure 4:
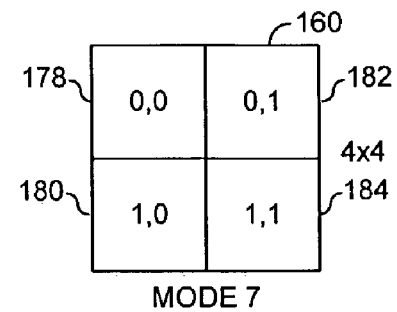

Referring to FIG. 4, a block diagram is shown illustrating a number of small block (or sub-block) sizes and shapes that may be used to perform motion estimation and/or motion compensation on the macroblock 150. When the macroblock 150 is segmented into the four 8×8 blocks 160-166 (e.g., mode 4), each 8×8 block may be optionally further segmented into two 8×4 sub-blocks 170 and 172 (e.g., mode 6), two 4×8 sub-blocks 174 and 176 (e.g., mode 5), or four 4×4 sub-blocks 178-184 (e.g., mode 7). The encoder 100 generally decides which "mode" to use for encoding each macroblock 150. In one example, an error score may be computed based on a closeness of match determination for each mode, with the modes that use more vectors being penalized (e.g., by increasing the respective error score) because of the additional bits that it will take to encode the motion vectors.

One aspect of the present invention generally provides a method of calculating an efficient parallel measurement on individual blocks of transformed and quantized coefficients. The measurement may be employed to determine which blocks, groups (or combinations) of blocks, and/or macroblocks may be set to zero. Another aspect of the present invention generally provides a method for successively aggregating the block-based measurements such that separate efficient decision mechanisms may operate individually (or independently) on a hierarchy of aggregated measurement values to determine the blocks, groups of blocks, and/or macroblocks that may be set to zero.

In a preferred embodiment of the present invention, a 4×4 block sum of absolute values (SAV) is generally performed on 16-bit quantized coefficients. In one example, the encoder 100 may be implemented as a H.264/MPEG-AVC compliant video encoder. The 4×4 block sum of absolute values may be weighted and/or programmable. Other block sizes may be implemented accordingly to meet the design criteria of a particular application.

The block SAVs may be compared with one or more fixed (e.g., predetermined) threshold values. In one example, different threshold values may be implemented for luma and chroma blocks. Blocks may be set to zero when the corresponding measurement values (e.g., SAVs) are less than the threshold values. In general, the measurement of block SAVs may be particularly efficiently calculated at the stage prior to serialization. For example, a quantization operation may be configured to provide the absolute values of the quantized coefficients as an intermediate result. In one example, the block measurement values may be accumulated separately for the luma and chroma blocks of a macroblock that are not set to zero by the first threshold stage.

A second fixed threshold stage may be implemented to determine individually whether one or more groups of blocks may have the coefficients set to zero. For example, a determination may be made whether all luma blocks of a particular macroblock may be set to zero and/or whether all chroma blocks of the particular macroblock may be set to zero. For the block types that are not set to zero, the accumulated measurement values may be summed and if the final aggregate value is less than a predetermined third threshold value, the entire macroblock may be set to zero (or skipped). In general, the threshold values for individual blocks may be smaller than the threshold values for groups of blocks, and the threshold values for groups of blocks may be smaller than the threshold value for the macroblock decision.

A progression and grouping of measurement values from blocks to groups of blocks to macroblocks may be implemented to exploit the various levels of efficient signaling that are generally available in a compressed video bitstream syntax. A particular example of a weighted programmable sum-of-absolute values (SAV) calculation may be illustrated by a case where a DC coefficient of the 4×4 block is left-shifted one bit (e.g., doubled) for inter-predicted blocks and both the DC coefficient and the lowest frequency AC coefficients are doubled for intra-predicted blocks prior to contribution to the SAV calculation.

Figure 5:
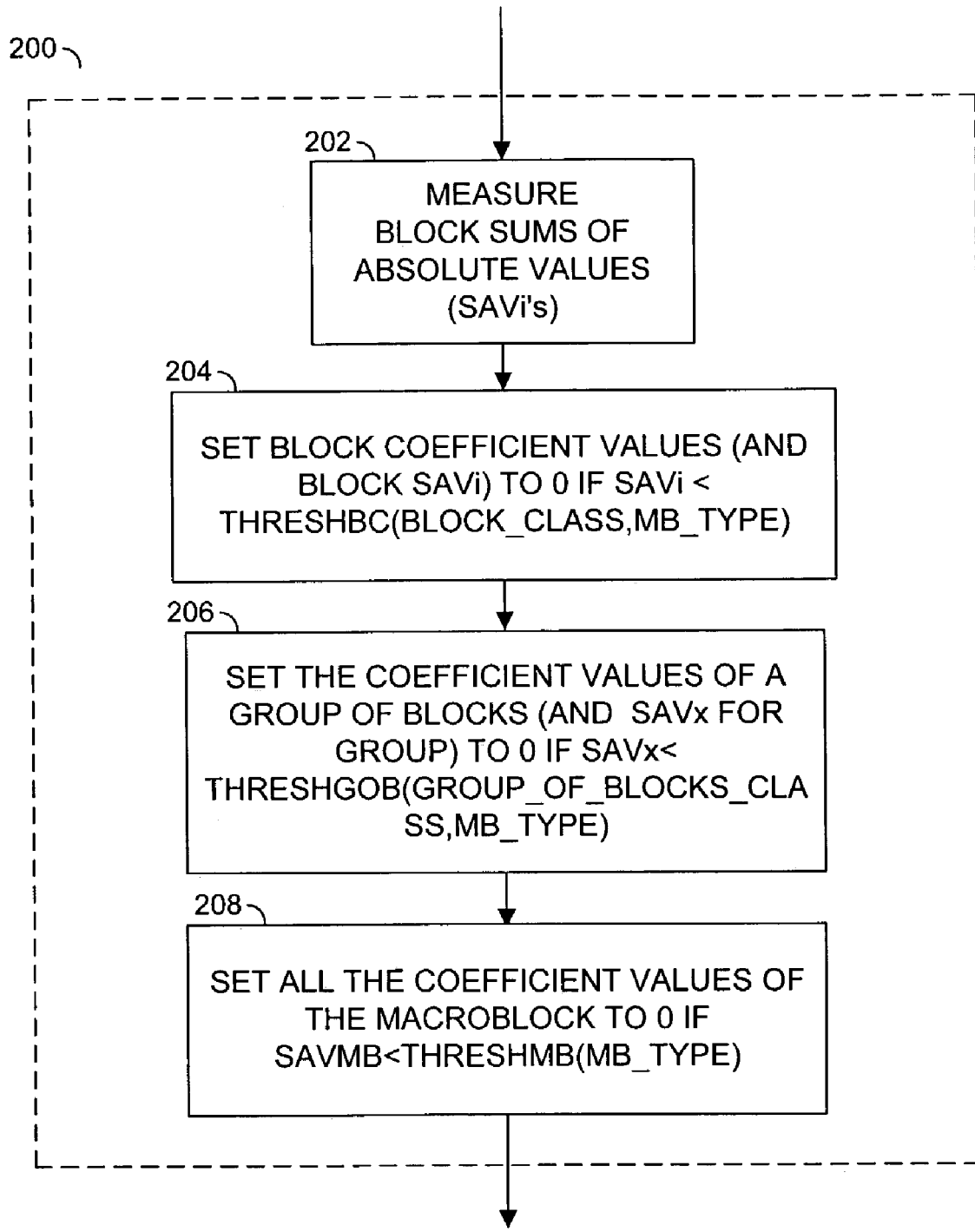
FIG. 5 is a flow diagram illustrating a process in accordance with a preferred embodiment of the present invention.

Referring to FIG. 5, a flow diagram 200 is shown illustrating a process in accordance with a preferred embodiment of the present invention. The data (e.g., coefficients) received from the transformation and quantization block 108 is generally employed to generate a sum of absolute values measurement (e.g., SAVi) for each individual block of a macroblock (e.g., the block 202). The process 200 may continue by successively aggregating the block-based measurements (e.g., SAVi) to determine block-based measurements for (i) one or more groups of blocks (e.g., SAVx) and (ii) the macroblock (e.g., SAVMB). For example, one group of blocks may include all luma blocks of a macroblock (e.g., SAVx=SAVluma). Another group of blocks may include all chroma blocks of a macroblock (e.g., SAVx=SAVchroma). Other groups of blocks may be implemented to meet the design criteria of a particular implementation.

When the block sums of absolute values (or other appropriate block measurements) have been determined for each of the blocks, the process 200 generally continues by setting block coefficient values and the corresponding block-based measurement value SAVi to zero for blocks where the value SAVi is less than a predetermined threshold for the blocks (e.g., the block 204). In general, the predetermined threshold used in setting the block coefficient values to zero may be based on a class of the block and/or a type of the macroblock containing the block (e.g., THRESHBC(block-class, MB-type)).

In one example, a 4:2:0 video encoder may have block classes (e.g., block_class) of luma4×4 and chroma4×4. In such an example, a value ThreshBC(luma4×4, MB_type) may represent the threshold value for a luma 4×4 block and a value ThreshBC(chroma4×4, MB_type) may represent the threshold value for a chroma 4×4 block from a particular type (e.g., intra or inter) of macroblock. In a preferred embodiment of the present invention, a block threshold value of 3 may be implemented for both luma and chroma blocks. However, other block threshold values may be selected to meet the design criteria of a particular implementation. For example, block threshold values of 4 or 7 may be used.

In one example, various groups of blocks may be assigned a class (e.g., group_of_blocks_class). For one type of entropy coding (e.g., signaling and coding the absence of coefficients), the group_of_blocks_class may have values of lumaMB, CrMB, or CbMB. For example, a value ThreshGOB(lumaMB,MB_type) may represent the threshold value for the sum of the SAVi values for all luma blocks (e.g., SAVlumaMB) in a macroblock. A value ThreshGOB (CrMB) may refer to a value Thresh(CrMB,MB_type) or the threshold for the sum of the SAVi values for all of the chroma blocks from one color plane (e.g., SAVCrMB for the Cr blocks and SAVCbMB for the Cb blocks). For example, in an example of a H.264 macroblock, the value SAVluma may comprise a sum of sixteen block values, the values SAVCrMB and SAVCbMB may each comprise a sum of four block values. A value (e.g., ThreshMB(MB_type)) may represent, in one example, the threshold value for the sum of all SAVx values from the three groups of blocks (e.g., Luma blocks, Cr blocks and Cb blocks) in the particular macroblock.

When the sum of absolute values for a group of blocks (e.g., SAVx) is less than a predetermined threshold value for groups of blocks (e.g., THRESHGOB), the coefficient values of the group of blocks and the corresponding SAVx value may be set to zero (e.g., the block 204). In a preferred embodiment, the threshold value THRESHGOB for a group of blocks consisting of all 16 4×4 luma blocks in a 16×16 macroblock may be set at 5. The threshold value 5 may also be used, in one example, for a group consisting of the four 4×4 luma blocks in each 8×8 block of the macroblock and for all the chroma blocks in a macroblock. In one example, the predetermined threshold THRESHGOB may be based upon a class of the group of blocks (e.g., group_of_blocks_class) and a type (e.g., MB-type) of the particular macroblock containing the group of blocks.

The sum of absolute values for an entire macroblock (e.g., SAVMB) may also be determined. When the sum of absolute values SAVMB for the entire macroblock is less than a predetermined threshold for the macroblock (e.g., THRESHMB), all of the coefficient values of the macroblock and the corresponding value SAVMB may be set to zero (e.g., the block 206). In general, the threshold value THRESHMB may be determined based upon the type of the macroblock (e.g., MB-type). In general, the parallel SAV calculations are performed in the block 202. A particular 3-level hierarchy of aggregating the SAV values calculated during the block 202 to perform coefficient cancellation for various groups of blocks is generally employed in the blocks 204-208.

In one example, a SAV for a block in the H.264 video standard generally comprises a 16-element sum of all the quantized coefficient values in a 4×4 integer transform block. For a block encoded using the MPEG-2 standard, the SAV generally comprises a 64-element sum of all the coefficients in an 8×8 DCT block. In general, there are 24 4×4 blocks of coefficients in one 16×16 pixel macroblock when 4:2:0 video is used (e.g., 16 luma 4×4s i=0 . . . 15, 4 Cr 4×4s i=16 . . . 19, and 4 Cb 4×4s i=20 . . . 23.).

Figure 6:
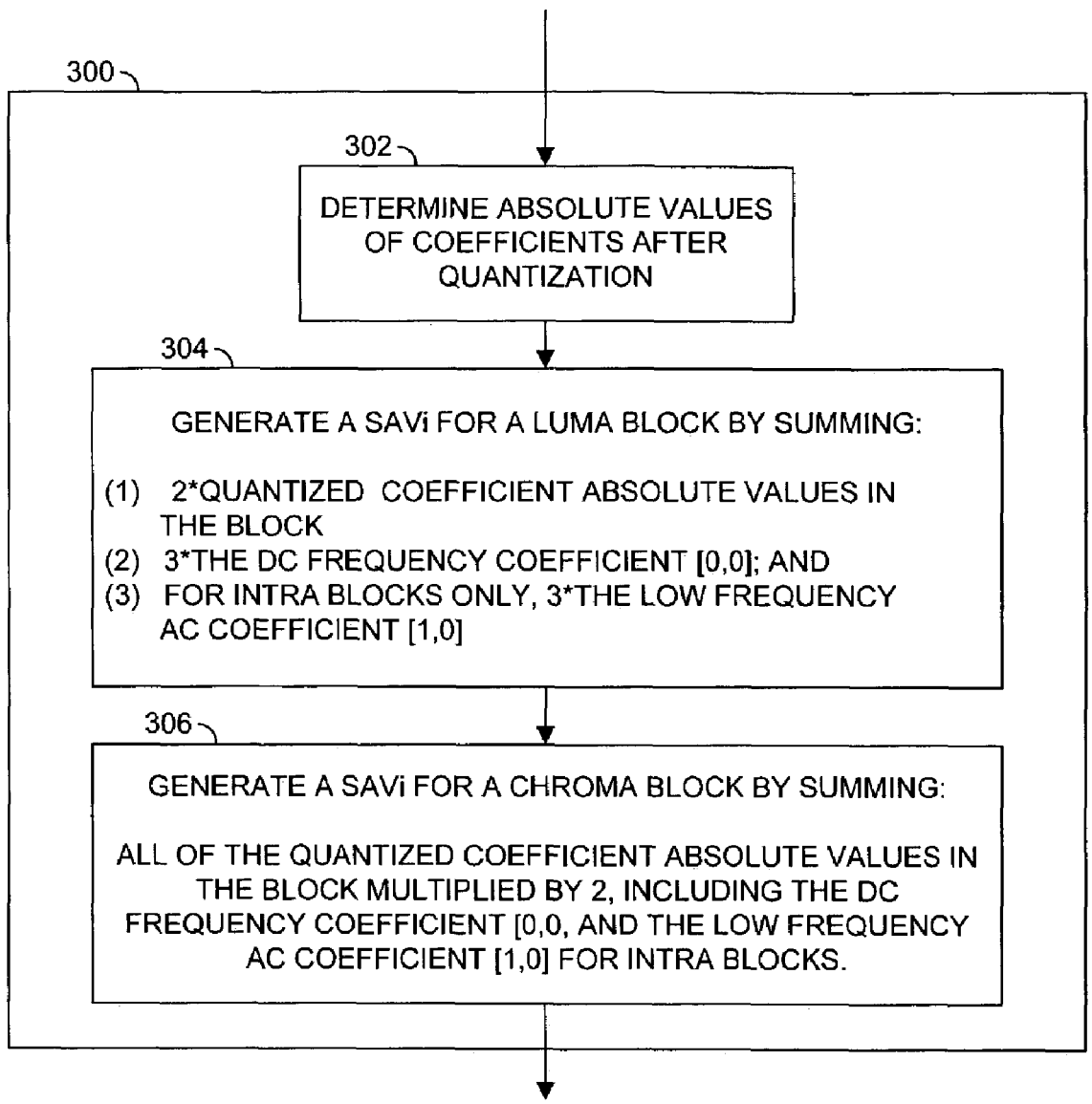
FIG. 6 is a more detailed flow diagram of a portion of the process of FIG. 5.

Referring to FIG. 6, a more detailed flow diagram 300 is shown illustrating the measurement of a block SAVi in the block 202 of FIG. 5. Following quantization, the absolute values of block coefficients is determined (e.g., the block 302). A block sum of absolute values for each luma block may be determined by summing twice the value of each quantized coefficient absolute value, except for the DC frequency coefficient (e.g., coefficient 0, 0) and the intra-block only coefficient 1, 0, whose values are tripled (e.g., the block 304). A block sum of absolute values for each chroma block may be determined by summing twice the value of each quantized coefficient absolute value without any exceptions (e.g., the block 306). In one example, the measurement of the block sums of absolute values may be integrated with the transformation and quantization steps.

The present invention may be applied to 4:4:4 format video as well as other formats of video containing more or less chroma blocks per macroblock (e.g., 4:2:2, 4:2:1, etc.). The present invention may be employed with entropy coding methods that group blocks together according to different criteria for various hierarchical techniques to efficiently signal that blocks and/or groups of blocks contain no coded coefficients.

The present invention may be implemented in hardware, software and/or a combination of hardware and software. In one example, SIMD, VLIW, or custom instructions may be implemented to exploit the parallelism in the sum of absolute values (SAV) calculation. The present invention may be implemented in any of an encoder, a transcoder, and a transcoding statmux system. The present invention may be implemented in any block-transform based (e.g., video, image, audio, etc.) signal coding system. The bitstreams produced by the present invention, may be stored, transmitted, and/or utilized internally to a system for, in one example, rate-control estimation purposes.

The function performed by the flow diagrams of FIGS. 5 and 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for improving rate distortion performance of a compression system through parallel coefficient cancellation in a transform comprising the steps of:
  (A) generating quantized coefficient values for each of a plurality of blocks in a macroblock;
  (B) determining a block sum value for each of the plurality of blocks in said macroblock using a sum of absolute values (SAV) of respective quantized coefficient values for each of the plurality of blocks; and
  (C) setting one or more of the quantized coefficient values of a block to zero in response to the block sum value of said block being less than a first predetermined threshold value.

2. The method according to claim 1, further comprising the steps of:
  determining a group of blocks sum of absolute values of the quantized coefficient values for one or more groups of one or more of said plurality of blocks in said macroblock; and
  setting the quantized coefficient values for said one or more groups of blocks to zero in response to a corresponding group of blocks sum value being less than a second predetermined threshold value.

3. The method according to claim 1, further comprising the steps of:
  determining a block sum of absolute values of the quantized coefficient values for said macroblock; and
  setting the quantized coefficient values of said macroblock to zero in response to said block sum of absolute values for said macroblock being less than a third predetermined threshold value.

4. The method according to claim 1, wherein said absolute values are calculated during quantization of said plurality of blocks.

5. The method according to claim 1, wherein said first threshold value is determined based on a class of said block and a type of said macroblock.

6. The method according to claim 2, wherein said second threshold value is determined based on a class of said group of blocks and a type of said macroblock.

7. The method according to claim 3, wherein said third threshold value is determined based on a type of said macroblock.

8. The method according to claim 1, wherein determining said block sum of absolute values comprises performing a weighted programmable sum of absolute values calculation.

9. The method according to claim 1, wherein the block sum of absolute values for each of the plurality of blocks are determined in parallel.

10. The method according to claim 1, wherein determining said block sum of absolute values for each of the plurality of blocks in said macroblock comprises:
   determining a block sum of absolute values for each luma block based on a sum of twice the value of each quantized coefficient absolute value, except for the DC frequency coefficient and triple the value of intra-block only coefficient; and
   determining a block sum of absolute values for each chroma block based on a sum of twice the value of each quantized coefficient absolute value.

11. An apparatus comprising:
   a first circuit configured to present quantized coefficients for a plurality of blocks in a macroblock; and
   a second circuit configured to calculate a block sum of absolute values for each of said plurality of blocks in response to said quantized coefficients, wherein said second circuit is further configured to set one or more of said guantized coefficients of a block to zero in response to a corresponding block sum of absolute values of said block having a value less than a first predetermined threshold value.

12. The apparatus according to claim 11, wherein said second circuit is further configured to set the quantized coefficients of a group of one or more of said plurality of blocks to zero in response to a block sum of absolute values of the quantized coefficients for said group of blocks having a value less than a second predetermined threshold value.

13. The apparatus according to claim 12, wherein said second circuit is further configured to set all quantized coefficients of a macroblock to zero in response to a block sum of absolute values of the quantized coefficients for said macroblock having a value less than a third predetermined threshold value.

14. The apparatus according to claim 11, wherein said apparatus comprises an encoder.

15. The apparatus according to claim 11, wherein said apparatus comprises a transcoder.

16. The apparatus according to claim 11, wherein said apparatus comprises a transcoding statmux system of a video transmission system.

17. The apparatus according to claim 11, wherein said second circuit is further configured to:
   set one or more of said quantized coefficients of a block to zero in response to a corresponding block sum of absolute values of said quantized coefficients for said block having a value less than a first predetermined threshold value;
   set the quantized coefficients of a group of one or more of said plurality of blocks to zero in response to a block sum of absolute values of said quantized coefficients for said group of blocks having a value less than a second predetermined threshold value; and
   set all quantized coefficients of a macroblock to zero in response to a block sum of absolute values of said quantized coefficients for said macroblock having a value less than a third predetermined threshold value.

18. The apparatus according to claim 17, wherein said first threshold value is smaller than said second threshold value.

19. The apparatus according to claim 17, wherein said second threshold value is smaller than said third threshold value.

20. The apparatus according to claim 17, wherein said first threshold value is smaller than said second threshold value and said second threshold value is smaller than said third threshold value.

21. The apparatus according to claim 11, further comprising a zig-zag scan serialization circuit coupled to said second circuit.

22. An apparatus comprising:
   means for presenting quantized coefficients for a plurality of blocks in a macroblock; and
   means for determining a block sum of absolute values for each of said plurality of blocks in response to said quantized coefficients, wherein respective quantized coefficients of each of said plurality of blocks are set to zero in response to said block sum of absolute values for each of said plurality of blocks and one or more predetermined threshold values.

* * * * *